GEORGE F. WILSON.
Improvement in the Manufacture of Steel.

No. 125,107. Patented March 26, 1872.

Witnesses
C. B. Nottingham
J. R. Nottingham

Inventor.
George F. Wilson
by atty Hollok 125,107

UNITED STATES PATENT OFFICE.

GEORGE F. WILSON, OF PROVIDENCE, RHODE ISLAND.

IMPROVEMENT IN THE MANUFACTURE OF STEEL.

Specification forming part of Letters Patent No. 125,107, dated March 26, 1872.

*To whom it may concern:*

Be it known that I, GEORGE F. WILSON, of Providence, county of Providence, State of Rhode Island, have invented certain new and useful Improvements in the Manufacture of Steel, of which the following is a specification:

My invention relates to the method of refining cast-iron or converting it into steel by the introduction into the molten metal, for the purpose of desulphurizing, dephosphorizing, and decarbonizing, of air, substantially in the manner practiced in the well-known Bessemer process. This process has heretofore generally been carried out in costly apparatus, and has been not unattended with danger. The metal had to be melted in one furnace and then transferred to a separate converting furnace, which operation was expensive, laborious, and often dangerous, while the apparatus was liable to get out of order, and delay was frequently incurred in order to make the necessary repairs. I have proposed to remedy these difficulties by combining the two necessary operations in one furnace of a peculiar construction and operation.

In the accompanying drawing, which represents a furnace made in accordance with my invention—

Figure 1:
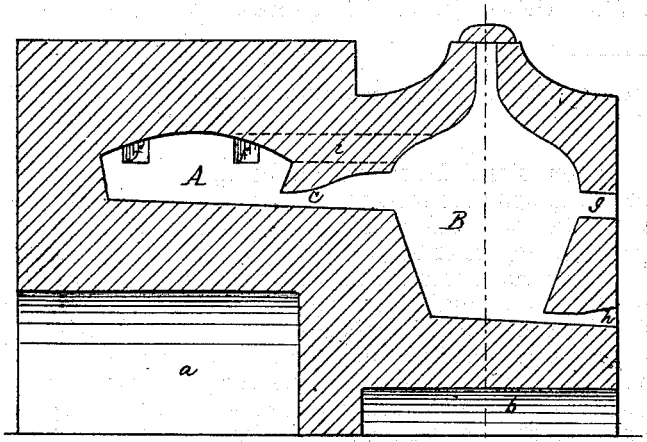
Figure 2:
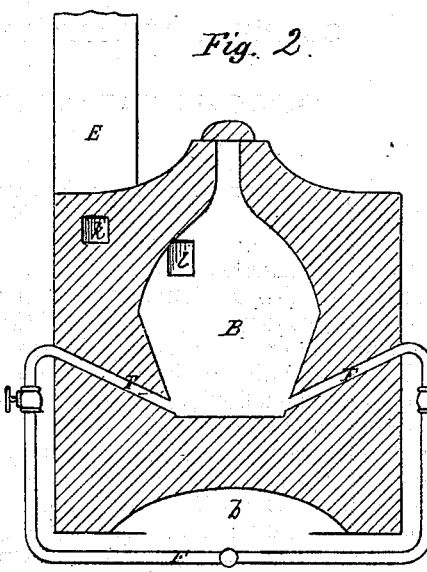
Figure 3:
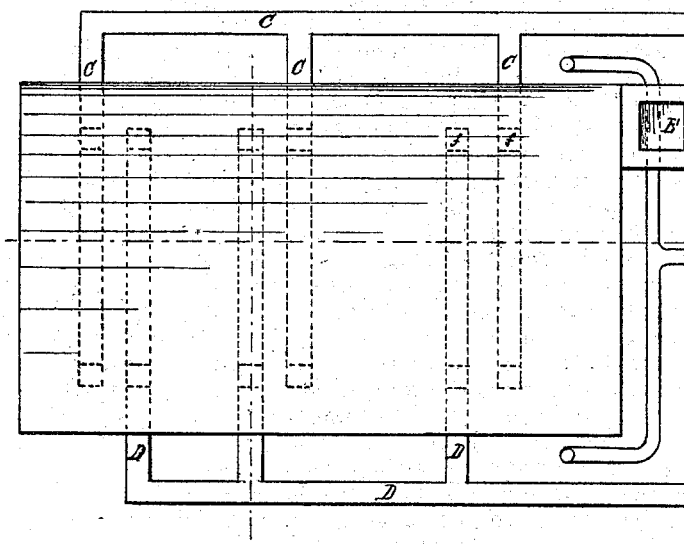
Figure 4:
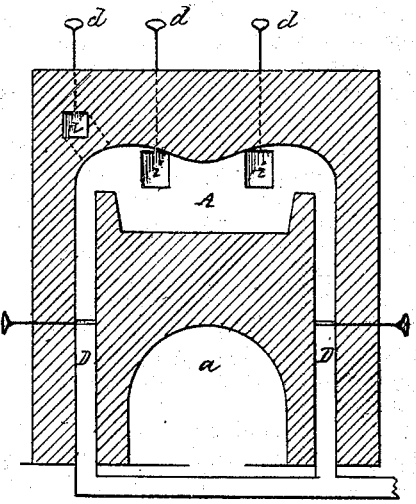

Figure 1 is a longitudinal vertical section. Fig. 2 is a transverse vertical section through the converter. Fig. 3 is a plan. Fig. 4 is a transverse vertical section through the reducing-furnace.

A is the reducing-furnace, and B the converter, the bed of each being built upon a suitable arch, $a$ or $b$. The hearth or sole of the reducing-furnace inclines slightly toward the retort-shaped converter, the bottom of which is considerably lower than that of the heating-furnace A, and the two furnaces are connected by one or more channels provided with tap-holes $c$, through which the molten metal in the reducing-furnace will flow into the converter. These holes are closed by means of removable plugs of fire-brick or other refractory material, and arranged in a manner well understood by iron manufacturers, so that they may be tapped or removed when occasion requires. The air and combustible heated gases required to produce the high degree of heat needed are supplied to the reducing furnace through flues or conduits C D, the former being the air-flues, the latter the gas-flues. All these flues are supplied with dampers $d$, or valves for regulating the degree of heat, and they discharge the air and gases into the reducing-chamber through ports $f$, suitably arranged in the upper part of the chamber, the mixture of said air and gases taking place in the chamber and setting up intense combustion of the charge in the furnace. The air and gas-flues are arranged alternately and in pairs, the two flues of each pair being close together, as shown, and discharging their contents in close proximity, so as to effect speedy intermixture of the same. The products of combustion are carried from the reducing to the converting-furnace, through flues $i$, heating the latter as intensely as may be required. There is also provision made, as shown, for the admission of gas and air into the converting-furnace, in order that the same may be supplied to the converter in case it should be found necessary at any time. The valves or dampers and flues are, however, so arranged that the products of combustion may, if desired, be turned directly from the reducing-furnace into the chimney E, through flues $k$, without passing through the converting-furnace. The converting-chamber is provided with pressure blast-pipes F, entering the furnace at or near the bottom, so as to discharge air into the molten mass therein contained. The top of the retort-shaped furnace is shaped and constructed to admit of the spectroscope test, being made at this point to determine when the metal has come to proper condition. The products of combustion pass from the converter to the chimney through one or more flues, $l$. The blast-tubes F are arranged on opposite sides of the converter, at or near the bottom and one end thereof, and the chimney-flue or flues $l$ in the opposite end of the converter, at the top or side of the arch. In this way all of the crude iron is with greater certainty acted on by the air, and a more uniform conversion of the same into steel is obtained.

A furnace thus constructed is cheap, but very efficient. Both operations are carried on in the same structure, and a continuity of operation is secured. After the reducing-furnace has been charged, the iron is melted thoroughly and the molten mass is then permitted to pass through the tap-hole or holes C into the converter, where it is converted into refined iron or steel, as desired, and as well understood by manufacturers of iron. Tap-holes $g\ h$ are, of course, formed in the converter, and the metal, after having been brought to proper condition, is run out from the furnace into suitable molds. The tap-holes are closed with fire-brick, held in place by clamps attached to the iron-work inclosing the body of the furnace.

Having now described my invention and the manner in which the same is or may be carried into effect, what I claim, and desire to secure by Letters Patent, is—

1. The combination of the reducing and converting-chamber, comprised in one furnace, with the air and gas-flues, substantially as shown and described.

2. The alternate arrangement in the furnace of the air and gas flues, substantially as shown and described.

3. The mode of heating the converter by the introduction therein of the products of combustion from the reducing-furnace, substantially as shown and set forth.

4. The combination with, and relative arrangement in, the converter of the air-tuyeres or blast-tubes and the chimney-flue or flues, substantially as and for the purposes set forth.

In testimony whereof I have signed my name to this specification before two subscribing witnesses.

GEO. F. WILSON.

Witnesses:
A. POLLOK,
EDM. F. BROWN.